United States Patent [19]

Okada et al.

[11] 4,035,033
[45] July 12, 1977

[54] ANTI-SKID CONTROL SYSTEM

[75] Inventors: Tsugihiro Okada, Hitachi; Norio Yokozawa, Fuchu, both of Japan

[73] Assignee: Hitachi, Ltd., Japan

[21] Appl. No.: 597,175

[22] Filed: July 18, 1975

[30] Foreign Application Priority Data

Aug. 5, 1974  Japan .............................. 49-89072

[51] Int. Cl.² ......................................... B60T 8/10
[52] U.S. Cl. ............................. 303/109; 188/181 C
[58] Field of Search .............. 188/181 C; 244/111; 303/20, 21 ALL, 95, 96, 106, 109; 307/10 R; 317/5; 324/161; 340/53, 62

[56] References Cited

U.S. PATENT DOCUMENTS

| 3,245,727 | 4/1966 | Anderson et al. ............. 303/106 |
| 3,622,208 | 11/1971 | Krugler, Jr. ................... 303/109 |
| 3,642,329 | 2/1972 | Zechnall et al. ............. 303/21 BE |
| 3,701,568 | 10/1972 | Lewis et al. ................. 303/21 P |
| 3,754,797 | 8/1973 | Rodi et al. ................... 303/106 |
| 3,834,770 | 9/1974 | Fleischer et al. ............. 303/21 P |
| 3,880,475 | 4/1975 | Booher ......................... 303/21 BE |

Primary Examiner—Stephen G. Kunin
Attorney, Agent, or Firm—Craig & Antonelli

[57] ABSTRACT

An anti-skid control system for an automotive vehicle comprising apparatus for inhibiting the operation of anti-skid apparatus in a vehicle speed range lower than a predetermined value at which the full braking force can be imparted to the wheels without giving rise to any danger, so that the anti-skid control system can operate with improved reliability.

1 Claim, 4 Drawing Figures

ANTI-SKID CONTROL SYSTEM

This invention relates to the art of anti-skid control for automotive vehicles, and more particularly to an anti-skid control system comprising means for ensuring the safety of drive when anti-skid means are actuated in a low speed range.

An anti-skid control system for automotive vehicles comprises generally a vehicle speed sensor for detecting the speed of the vehicle body, a wheel speed sensor for detecting the speed of the wheels, and means for comparing the detected wheel speed with the detected vehicle speed. The anti-skid control system acts to relieve the braking force applied to the wheels so as to release the wheels from the skidding state in which the wheel speed, which is generally equal to the vehicle speed in the slip-free state, is reduced to less than a predetermined value determined by the relationship between the vehicle speed and the wheel speed.

The wheel speed sensor is commonly of the type in which the rotation of the wheels is utilized to induce an electromotive force and the voltage or frequency of the induced electromotive force is converted into information representative of the rotating speed of the wheels. Thus, the induced electromotive force is small and unstable when the speed of the wheels is low. Further, the output of the wheel speed sensor tends to be adversely affected by such external factors as noise and stray voltage, and it is therefore difficult to obtain accurate information representative of the real rotating speed of the wheels. Suppose, for example, that the information representative of the rotating speed of the wheels disappears, then the anti-skid control means decides that the wheels are locked from rotation, and the braking force imparted to the wheels is relieved even when the brake pedal is kept depressed by the driver. Unlocking of the wheels may sometimes result in great danger when the braking force imparted to the wheels is relieved in an improper situation other then the situation in which the anti-skid operation must be carried out.

In an effort to obviate such danger, an anti-skid control system employing an improved and more reliable control means has been proposed and put into practical use, which is capable of detecting the information output of the wheel speed sensor no matter how low the information level may be and is also capable of distinguishing the information from noises. This proposed anti-skid control system has however been defective in that the cost thereof is very high and the precision thereof is limited.

Another anti-skid control system employing logic elements for the anti-skid control is also known, in which a voltage inversely proportional to the rotating speed of the wheels is generated when the speed of the wheels is reduced nearly to zero, and the logic elements act to actuate the brakes in response to the generation of the voltage which increases in inverse proportion to the reductin in the rotating speed of the wheels. However, this known anti-skid control system is not fully reliable due to the fact that the running state of the vehicle is detected by detecting solely the rotating speed of the wheels. Thus, when, for example, the wheels are locked from rotation due to abrupt application of the brakes to the vehicle running on a road in rainy weather, the brakes are continuously actuated and the anti-skid means do not operate resulting in great danger.

With a view to obviate the prior art defects pointed out hereinbefore, it is a primary object of the present invention to provide a novel and improved anti-skid control system for automotive vehicles which ensures the safety of drive, which can operate reliably and which is inexpensive.

The anti-skid control system according to the present invention is featured by the provision of means for preventing the operation of the anti-skid means in a vehicle speed range lower than a predetermined value at which the full braking force can be imparted to the wheels without giving rise to any danger.

In accordance with the present invention, there is provided an anti-skid control system for an automotive vehicle comprising means for detecting the speed of the vehicle body, means for detecting the speed of the wheels, and control means for relieving the braking force imparted by brake means to the wheels depending on the relation between the detected vehicle speed and the detected wheel speed, said system further comprising means responsive to the output of said vehicle speed detecting means for detecting the driving of the vehicle in a low vehicle speed range at which the full braking force can be imparted to the wheels without giving rise to any danger, and means for inhibiting the operation of said control means in such a low vehicle speed range, whereby the full braking force can be imparted to the wheels in such low vehicle speed range while inhibiting said control means from fulfilling the primary function thereof.

The above and other objects, features and advantages of the present invention will be apparent from the following detailed description taken in conjunction with the accompanying drawings, in which.

The present invention will now be described in detail with reference to the drawings.

There are four combinations between the speed of the body of a vehicle and the speed of the wheels of the vehicle as shown in Table 1.

Table 1

| Wheel speed | Vehicle speed High | Low |
|---|---|---|
| High | A | C |
| Low | B | D |

In Table 1, the vehicle speed is defined as a low speed when it is lower than a predetermined value at which the full braking force can be imparted to the wheels without giving rise to any danger. This predetermined value is, for example, 5 kilometers per hour. The wheel speed is also defined as a low speed when it is lower than 5 kilometers per hour.

The region A in Table 1 has not any direct concern with the present invention since both the vehicle speed and the wheel speed are higher then the low speed to which the safety measure according to the present invention is directed. In the region B, it can be considered that proper anti-skid control is performed. Thus, even if the wheel speed responsive signal might disappear in this region B, the proper anti-skid operation would be reliably carried out without being adversely affected thereby.

The region C does not exist as a matter of fact, and is thus a redundant region since the speed of the wheels cannot physically exceed the speed of the vehicle body. In the region D, erroneous operation tends to take place due to the difficulty of discriminating the skidding state of the wheels from the normal braked state depending on the sensitivity of the wheel speed sensor. It is therefore preferable to impart the full braking force to the wheels when the vehicle speed is detected to fall within this region D. The desired anti-skid control may be satisfactorily performed even when the regions D and C are combined together to provide a simplified composite region. This is convenient in that the skidding state of the wheels can be discriminated from the normal braked state by merely detecting the level of the speed of the vehicle body. Thus, the full braking force may be imparted to the wheels when the speed of the vehicle body is reduced to less than the predetermined value of 5 kilometers per hour at which the full braking force can be imparted to the wheels without giving rise to any danger.

Figure 1:
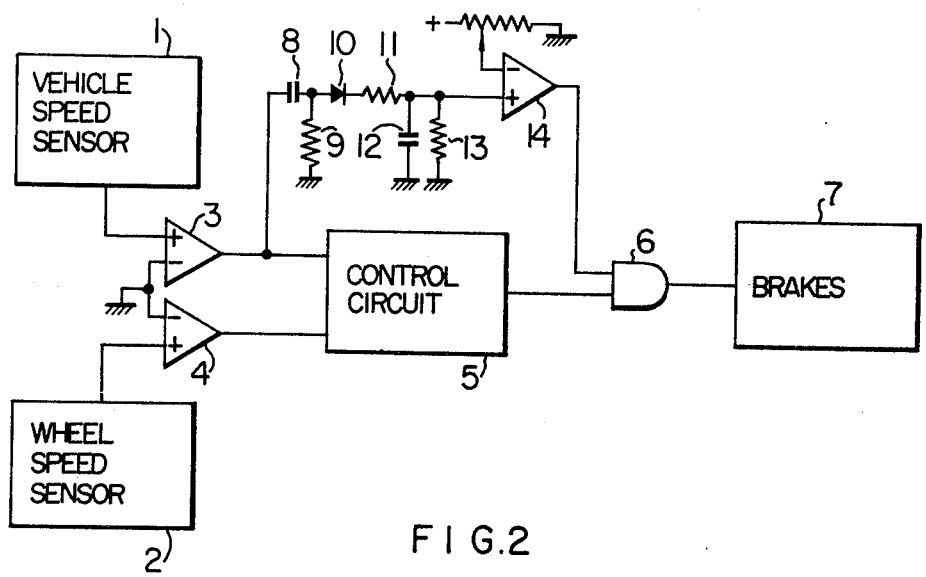
FIG. 1 is a circuit diagram of an embodiment of the anti-skid control system according to the present invention.

Referring now to FIG. 1 showing an embodiment of the present invention, a vehicle speed sensor 1 detects the speed of the body of a vehicle to generate a sinusoidal waveform having a frequency proportional to the speed of the vehicle body, and a wheel speed sensor 2 detects the speed of the wheels of the vehicle to generate a sinusoidal waveform having a frequency proportional to the speed of the wheels. The sinusoidal waveform outputs of these sensors 1 and 2 are applied to a first comparator 3 and a second comparator 4 respectively. Each of the first and second comparators 3 and 4 delivers an output of square waveform whose frequency coincides with the input frequency. The outputs of the first and second comparators 3 and 4 are applied to a control circuit 5 which detects the relation between the vehicle speed and the wheel speed on the basis of the inputs applied from the comparators 3 and 4. An output voltage of high level appears from the control circuit 5 when it is found necessary to relieve the braking force imparted to the wheels. An AND gate 6 is turned on and this output signal is applied through the AND gate 6 to brake means 7 so as to relieve the brake fluid pressure imparted to the wheels.

A differentiator consisting of a first capacitor 8 and a first resistor 9 is connected to the output terminal of the first comparator 3 so as to apply a pulse voltage to the anode of a diode 10 by differentiating the square waveform output of the first comparator 3. This pulse voltage is applied through the diode 10 to an integrator consisting of a second resistor 11 and a second capacitor 12 to charge the second capacitor 12. In a short time, the level of the pulse voltage is reduced to less than the potential level of the charge stored in the second capacitor 12. This charge is not discharged through the resistor 9 but through a third resistor 13. A third comparator 14 is connected between the integrator and the AND gate 6.

Figure 2:
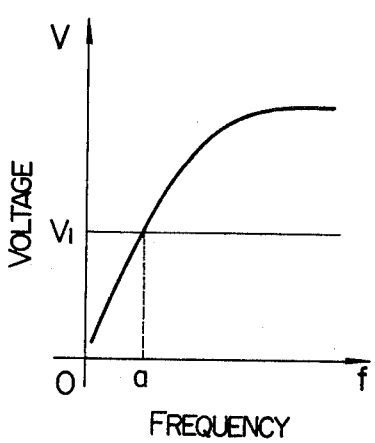
FIG. 2 is a graphic illustration of the operation of the vehicle speed responsive signal generating means which controls the operation of the control circuit in FIG. 1.

FIG. 2 shows the relation between the frequency $f$ detected by the vehicle speed sensor 1 and the terminal voltage V of the second capacitor 12. In FIG. 2, $a$ represents the vehicle speed at which the full braking force can be imparted to the wheels without giving rise to any danger. Thus, when the voltage at the negative terminal of the third comparator 14 is adjusted to be equal to the terminal voltage $V_1$ of the second capacitor 12 corresponding to the value $a$, an output of ground potential level appears from the third comparator 14 when the vehicle speed is reduced to the value $a$ at which the full braking force can be imparted to the wheels without giving rise to any danger.

It will be seen from the description given hereinbefore that the input applied from the third comparator 14 to the AND gate 6 is of high voltage level when the vehicle speed is higher than the value $a$ shown in FIG. 2, and thus, the output signal of the control circuit 5 can be applied through the AND gate 6 to the brake means 7 in such a high speed range. On the other hand, the full braking force can be imparted to the wheels in the speed range lower than the value $a$ due to the fact that an output of ground potential level appears from the third comparator 14 and an output of ground potential level appears also from the AND gate 6.

The system according to the present invention is designed so that the low speed range, in which the vehicle speed sensor and wheel speed sensor deliver very low and unstable output signals, is lower than the upper limit of the vehicle speed at which the full braking force can be practically imparted to the wheels without giving rise to any danger. Thus, the vehicle can be safely and reliably stopped in the low speed driving range in spite of the fact that the vehicle speed sensor and wheel speed sensor deliver very low and unstable output signals in such a speed range. Further, the first and second comparators 3 and 4 need not have any especially high detecting sensitivity. Thus, inexpensive comparators of simple construction can be used as these comparators.

Figure 3:
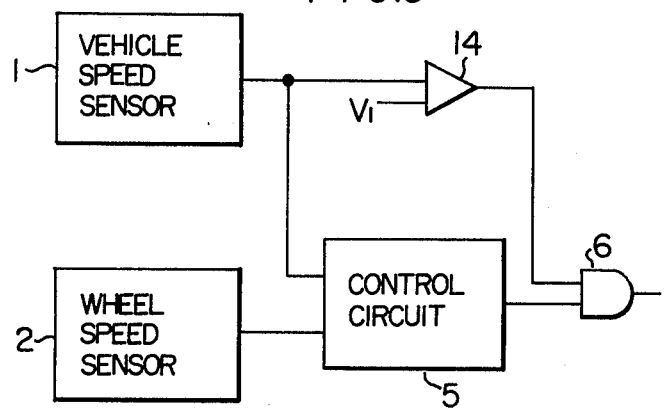
FIGS. 3 and 4 are circuit diagrams of other embodiments of the present invention.

FIG. 3 shows a modification in which the elements 3, 4 and 8 to 13 in FIG. 1 are eliminated and the analog outputs of the vehicle speed sensor 1 and wheel speed sensor 2 are applied directly to the control circuit 5.

The values of the vehicle speed and wheel speed defining the regions A to D in Table 1 may be suitably changed so as to freely set the speed range at which the anti-skid mechanism is inhibited from operation.

Figure 4:
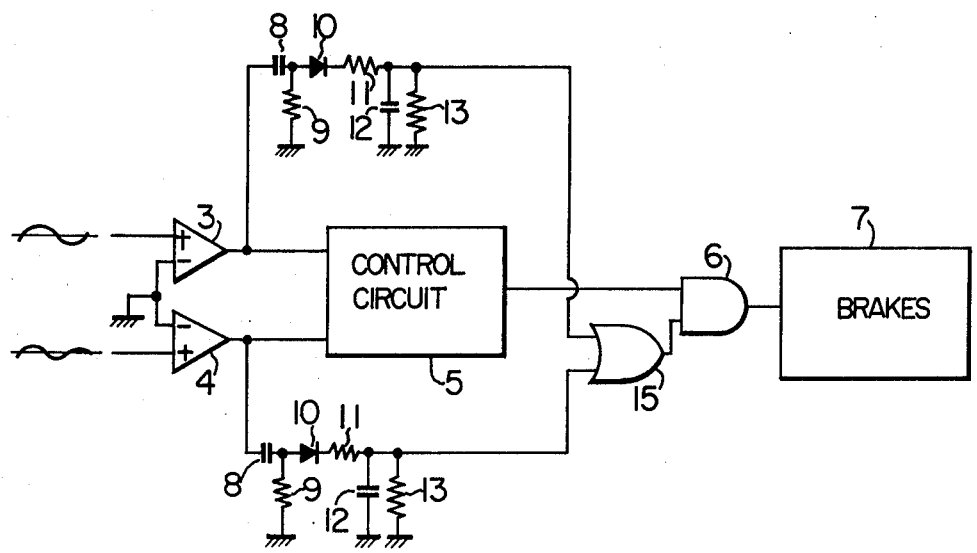

FIG. 4 shows a modification which satisfies the condition above specified. In FIG. 4, additional elements 8 to 13 are connected to the output terminal of the second comparator 4, and an OR gate 15 is provided while eliminating the third comparator 14 in FIG. 1. Referring to FIG. 4, the outputs of the vehicle speed sensor 1 and wheel speed sensor 2 not shown are respectively applied through the differentiators 8, 9, diodes 10 and integrators 11, 12 to the OR gate 15, and the output of the OR gate 15 is applied to the AND gate 6. Thus, in this modification, the region in which the anti-skid mechanism is inhibited from operation can be freely determined by suitably selecting the values of the elements 8 to 13 connected to the output terminals of the respective comparators 3 and 4.

It will be understood from the foregoing detailed description of the present invention that the anti-skid effect can be fully exhibited without requiring any especial means of high sensitivity and complex structure for detecting the output signals of the vehicle speed and wheel sensors, and yet, the vehicle can be safely and reliably stopped in the low speed driving range.

What is claimed is:

1. An anti-skid control system for an automotive vehicle having a plurality of wheels comprising means for providing a signal representative of vehicle body speed, means for providing a signal representative of wheel speed, wherein the means for providing a signal representative of vehicle body speed is independent from the means for providing a signal representative of wheel speed, and control means for relieving the braking force imparted by brake means to the wheels depending on the relation between the vehicle body speed and the wheel speed, said system further comprising means responsive to the vehicle body speed signal for detecting the driving of the vehicle in a low vehicle speed range at which the full braking force can be imparted to the wheels without giving to any danger, and means for inhibiting the operation of said control means in such a low vehicle speed range, whereby the full breaking force can be imparted to the wheels in such low vehicle speed range while inhibiting said control means for fulfilling the primary function thereof, and wherein the outputs of said first and second comparators are further applied to a first and second means for providing output voltages proportional to said wheel speed and said vehicle body speed respectively, said two output voltages being combined in an additional circuit means for generating a signal whose output is used to inhibit the output from said control means when the two output voltages fall within a predetermined range.

* * * * *